Feb. 14, 1967 D. B. WALKER, JR., ETAL 3,304,503

NOISE REDUCING SYSTEM

Filed April 9, 1963 2 Sheets-Sheet 1

INVENTORS
Daniel B. Walker Jr.
John F. Sarallo.
BY
Mueller & Aichele
Attys.

NOISE REDUCING SYSTEM

Filed April 9, 1963 2 Sheets-Sheet 2

INVENTORS
Daniel B. Walker Jr.
John F. Sarallo
BY
Mueller & Aichele
Attys.

United States Patent Office 3,304,503
Patented Feb. 14, 1967

3,304,503
NOISE REDUCING SYSTEM

Daniel B. Walker, Jr., Bellwood, and John F. Sarallo, Chicago, Ill., assignors to Motorola, Inc., Franklin Park, Ill., a corporation of Illinois Filed Apr. 9, 1963, Ser. No. 271,766
11 Claims. (Cl. 325—478)

This invention relates to noise blanking circuits in general, and more particularly to an improved impulse noise blanking circuit for use in radio communication receivers.

It is well known that impulse noise disturbances which are superimposed on a carrier wave signal can seriously impair the translation of the desired signal within a radio receiver. The problem may be paticularly critical in mobile communications equipment, where inpulse noise energy from ignition systems, high voltage leakage, lightning flashes and the like is coupled to a highly sensitive receiver and appears as undesirable audio output. It may be further aggravated if the receiver is operating in a fringe area where the level of strength of the desired carrier wave is relatively weak.

Many types of devices are known for minimizing or eliminating such noise disturbances. Such devices are described and claimed in U.S. Patents Nos. 2,901,601 and 3,014,127 both assigned to Motorola, Inc., the assignee of the present application. These systems detect noise pulses in an early stage of the receiver and removes the effects of the noise pulses by interrupting the signal conduction at a point preceding the relatively high selectivity portion of the receiver. The system of the present invention is an improvement over devices of this type and overcomes a problem which has arisen in prior systems.

One such problem occurs during the operation of a radio receiver when an undesired signal of nearly the same frequency as the desired signal may be present. Selectivity, to filter out the undesired signal, is provided by the intermediate frequency stages, thus the signal which is not desired is present in the receiver in the preceding radio frequency stages. However, if a noise blanker is used which turns off the radio frequency stage whenever a noise impulse is present in this stage, an undesirable form of interference known as modulation splatter may occur. In rapidly turning on and off the radio frequency stage of a receiver, by means of blanking pulses, side bands are generated through modulation of the undesired signal by the blanking pulses. These side bands may be very close in frequency to the desired signal and within the pass band of the intermediate frequency stages. In such cases the undesired side bands will not be filtered out and will appear in the receiver output as interference.

As a noise pulse passes through the stages of a receiver it is amplified and stretched in time. Since the receiver should be turned off during the entire time that the noise pulse is present in the stage of the receiver which is being blanked, blanking in the later stages of the receiver requires that the receiver be turned off for an appreciably longer time than if the blanking is accomplished in the earlier stages of the receiver.

It is therefore an object of the present invention to provide a radio receiver with a noise blanker which is operative on the intermediate frequency sections of the receiver to provide improved blanking characteristics in the presence of adjacent channel interference.

Another object is to provide a radio receiver with a noise blanker which is operative on both the radio and intermediate frequency sections of the receiver to provide an improved blanking characteristic.

Another object is to provide a radio receiver with a noise blanker which is operative on successive stages of the receiver to provide an improved blanking characteristic.

A feature of the invention is the provision of a radio receiver with a noise blanker coupled to a portion of the receiver antenna circuit, and having pulse detection and amplifying stages to form blanking pulses, with an accompanying circuit for applying the same to interrupt a receiver intermediate frequency stage during the occurrence of impulse noise disturbances.

Another feature is the provision of a radio receiver with a noise blanking system and with an accompanying circuit for applying the blanking pulses to interrupt both the receiver intermediate frequency and radio frequency stages.

Another feature is the provision of a radio receiver with a noise blanking system including a noise blanker coupled to a portion of the radio frequency section of the receiver and having pulse detection and amplifying stages to form blanking pulses with an accompanying circuit for applying the same to successive stages of the receiver.

The invention is illustrated in the drawings wherein.

In practicing the invention a radio communication receiver is provided with a noise blanker operative to detect noise disturbances. Signals are applied directly from the receiver antenna circuit to a radio frequency amplifier of the noise blanker, the threshold sensitivity of which can be decreased upon the application of a potential thereto. The output of the amplifier is detected in a pulse detector and the resulting pulses are amplified and utilized to disable intermediate frequency amplifier stages of the receiver for the duration of the applied pulse. Blanking pulses can also be applied to the RF section of the receiver to partially blank the noise signal in the RF section of the receiver with the remainder of the blanking taking place in the IF section. By achieving partial blanking in the RF section, the strength of the noise pulses reaching the IF sections of the receiver is attenuated and the blanking in the IF stages is more easily accomplished. In addition the period of time during which the receiver must be disabled is shortened and splatter generated in the radio frequency portion of the receiver is removed.

A rate shut off circuit may be inserted in the noise blanker system to reduce the amplitude of the blanking pulses applied to the receiver when the blanking pulse repetition rate is higher than a predetermined rate for longer than a predetermined time. In addition the output of a subsequent intermediate frequency stage of the receiver may be detected and this potential applied to a radio frequency stage of the noise blanker in order to decrease the threshold sensitivity of that radio frequency stage. This forms a level shut off which prevents the noise blanker from generating blanking pulses whenever the noise pulses are of low amplitude as related to the carrier so that the noise pulses will not cause appreciable interference.

Figures 1, 2, 3:
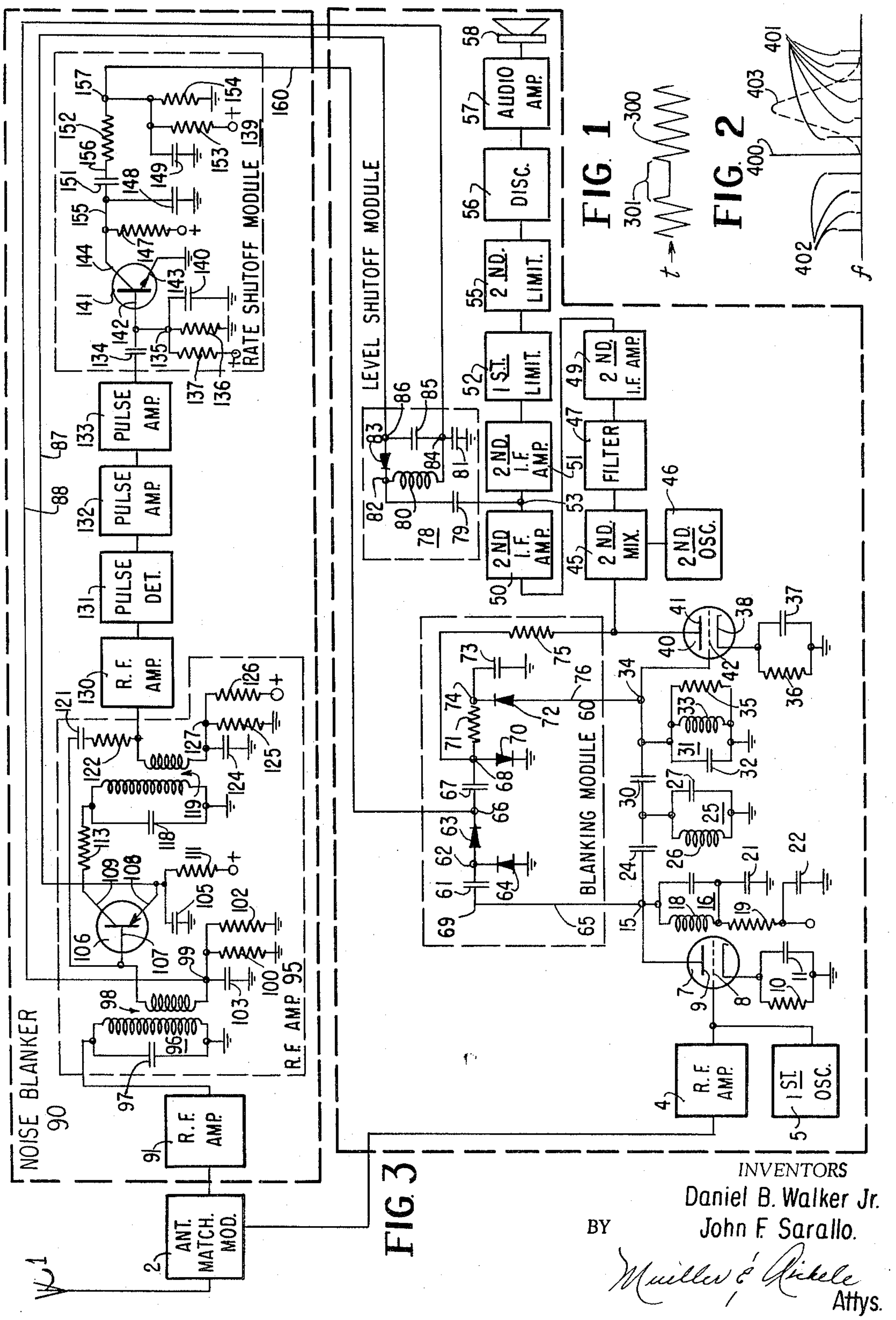
FIG. 1 illustrates the effect of a blanking pulse on a carrier wave signal.
FIG. 2 illustrates the generation of side bands of a pulse modulated carrier signal.
FIG. 3 is a partial schematic and partial block diagram of a radio receiver including the blanking system of the invention wherein signal conduction is interrupted in the intermediate frequency portion.

Although blanking in the RF section of a superheterodyne receiver has the advantage that noise pulses are short and the blanking pulses can also be short, certain disadvantages are encountered. This is illustrated in FIGS. 1 and 2, wherein FIG. 1 illustrates a carrier wave signal 300 which appears in the RF section of a receiver. During the time period 301 that the RF section is blanked, no signal appears in the output. It is to be pointed out, however, that the blanking pulse applied to the RF section may act to modulate any waves appearing in this stage of the receiver. FIG. 2 shows the frequency spectrum of a carrier wave which has been thus modulated. The fundamental frequency of the wave which is modulated is shown at 400, while the side bands generated by the modulation are shown at 401 and 402. The dotted curve 403 represents the IF band pass response of the receiver. The fundamental frequency 400 of the wave lies on the edge of the frequency response curve of the receiver and would be highly attenuated by the selective stages of the receiver so that the information contained on this carrier wave would not appear in the output of the receiver. However, some of the modulation frequencies 401 will fall within the band pass response of the receiver and are thus amplified in the subsequent receiver stages. It is this modulation of nearby undesired carriers by the blanking pulses which cause splatter to be generated causing noise output in the receiver.

In FIG. 3, there is illustrated a frequency modulation communication receiver 3 of the double superheterodyne type, and a noise blanker 90 coupled to the receiver. It is to be understood, however, that the invention is not limited to use in any particular type of receiver.

An antenna matching module 2 connects the antenna 1 to the radio frequency (RF) amplifier 4 of the receiver 3, and to the RF amplifier 91 of the noise blanker 90. The output of RF amplifier 4 and the first oscillator 5 are mixed and applied to the grid 8 of the first mixer tube 7. Resistor 10 provides a bias voltage for mixer tube 7 and capacitor 11 provides a bypass path about resistor 10. The output of the first mixer tube 7 is coupled from plate 9 to the grid 42 of the first intermediate frequency (IF) amplifier 40 by means of tuned circuits 16, 25, 31 and coupling capacitors 24 and 30. Resistor 36 furnishes a bias for IF amplifier 40 and capacitor 37 provides a bypass path for resistor 36. Plate 41 of IF amplifier 40 is coupled to the second mixer 45 where the IF signal is mixed with an input signal from second oscillator 46 to form a second IF signal. This second IF signal is filtered in filter 47 and amplified in second IF amplifiers 49, 50 and 51. The output of second intermediate frequency amplifier 51 is connected to first limiter 52, and from the first limiter to the second limiter 55, discriminator 56, and audio portion 57 of the receiver.

The output of RF amplifier 91 is connected to RF amplifier 95 through the tuned transformer 98. The secondary of transformer 98 is connected to the base 107 of transistor 106. Bias voltage for the base is furnished by resistors 100 and 102, connected between a positive voltage and ground. Capacitor 103 furnishes a low impedance path to ground, for alternating current signals. Bias resistor 111 is placed in the emitter circuit of transistor 106. Capacitor 105 provides a bypass across resistor 111 to prevent degeneration. Collector 109 of transistor 106 is connected to ground through resistor 113 and tuned circuit 114. The output of amplifier 95 is taken from transformer 119 the secondary of which is connected to the input of radio frequency amplifier 130. Resistor 122 and capacitor 121 furnish a feedback path from the input of radio frequency amplifier 130 to the input of radio frequency amplifier 95. Bias voltage for the base of radio frequency amplifier 130 is furnished by resistors 125 and 126 connected between a positive voltage and ground. Capacitor 124 furnishes a low impedance path to ground for alternating current signals from one side of transformer 119.

Pulse detector 131 receives the output of RF amplifier 130 and detects any pulses present above a predetermined threshold level. These pulses are amplified in pulse amplifiers 132, 133 and 139. The output of pulse amplifier 133 is connected to the base 142 of transistor 141 through capacitor 134. A bias voltage for the base is provided by resistors 136 and 137 connected between a positive potential and ground. Capacitor 140 is an RF signal bypass to ground. Resistor 147 is the load resistor for transistor 141 and is connected between collector 144 and a positive potential. Emitter 143 is connected to ground.

The output signal of transistor 141 is connected through capacitor 151, resistor 152, and conductor 160 to the blanking module 60. A bias voltage for the diodes in the blanking module is furnished by resistors 153 and 154 connected between the positive potential and ground. Capacitors 148 and 149 and resistor 152 shape the blanking pulse for optimum blanking action.

The input conductor 160 to the noise blanking module 60 is connected to common point 66. Diode 63 is connected between point 66 and point 62, and diode 64 is connected between point 62 and ground. Capacitor 61 is connected between point 62 and point 15, which is connected to one side of the tuned circuit 16. Capacitor 67 is connected between point 66 and point 68. Diode 70 is connected between point 68 and ground, and resistor 71 is connected between point 68 and point 74. Diode 72 is connected through conductor 76 to point 34 which is connected to one side of tuned circuit 31. Capacitor 73 is connected between point 74 and ground, and resistor 75 is connected between point 68 and the plate 41 of IF amplifier 40.

Level shut off module 78 is connected to the output of second IF amplifier 50 through capacitor 79. Capacitor 79 is connected to diode 83 and to terminal 82 of choke 80. Capacitor 81 is connected between terminal 84 and ground. Capacitor 85 is connected from point 86 to terminal 84 of choke 80. The anode of diode 83 is connected to capacitor 85 and the cathode of diode 83 is connected to terminal 82 of choke 80. Two output conductors 87 and 88 are connected between the level shut off module and the RF amplifier 95 of the noise blanker 90. Conductor 87 is connected to the emitter 108 of transistor 106. Conductor 88 is connected to point 99 of transformer 98.

In operation, the receiver is tuned to the desired signal and RF amplifier 91 of the noise blanking circuit 90 is tuned to a nearby but usually different frequency. The impulse noise bursts which would interfere with the desired signal will also appear at the frequency to which the noise blanker is tuned. These noise bursts are amplified in the RF amplifier stages 91, 95, and 130 of the noise blanking circuit and detected in the pulse detector 131. The pulses detected in detector 131 are amplified in pulse amplifiers 132, 133, and 139. In normal operation these pulses are properly shaped by the output circuitry of pulse amplifier stage 139, and applied by conductor 160 to the blanking module 60 connected to the first IF stage of the receiver.

The desired signal is amplified by amplifier 4 and mixed with the output of first oscillator 5 in the first mixer 7. The output of mixer 7 is applied to the grid 42 of IF amplifier 40 through tuned circuits 16, 25, and 31 and capacitors 24 and 30. The output of this amplifier is coupled to second mixer 45 where it is further detected and amplified.

The output of first mixer 7 appears across coil 18 of tuned circuit 16. The coil is connected to ground through capacitor 21 and 61 and diode 64. With no blanking pulse present, point 66 is biased at a positive potential by resistors 153 and 154, connected between a positive potential and ground. When point 66 has a positive potential with respect to ground, diodes 63 and 64 are biased so they are non-conducting, thereby preventing the signal appearing at point 15 from being bypassed to ground.

When a noise pulse has been detected by the noise blanker, a negative potential is developed and applied to conductor 160, in a manner to be described subsequently, so that point 66 becomes negative with respect to ground. Diodes 63 and 64 are then biased in the forward direction so that capacitor 61 is connected to ground and effectively bypasses the signal appearing across coil 18.

In addition to bypassing to ground the signal at the output of the first mixer, there is further blanking at the input tuned circuit of IF amplifier 40. Grid 42 of IF amplifier 40 is held near ground potential through tuned circuit 31. Cathode 38 of the amplifier 40 is at a positive potential because of the bias resistor 36. Grid 42 is thus at a negative potential with respect to the cathode. Point 68 is held at a very small positive potential by means of diode 70 and by resistor 75. This small positive potential biases diode 72 through resistor 71 so that it is non-conducting. When a negative pulse appears at point 66, it is coupled to diode 72 through capacitor 67 and resistor 71, biasing diode 72 so that is will conduct. The coil 33 of tuned circuit 31 is thus bypassed through capacitor 73 so that no signal can be develop across coil 33.

With no impulse noise present, transistor 141 is biased by resistors 136 and 137 so that it is non-conducting. The positive supply voltage is applied through resistor 147 to capacitor 151 and to collector 144 of transistor 141. A less positive voltage is applied to the other side of capacitor 151 through resistor 152 from the midpoint of voltage divider 153, 154. Since transistor 141 is non-conducting capacitor 151 will charge until the voltage across it is equal to the voltage drop across resistor 153.

Upon the detection of impulse noise by the noise blanker, positive pulses appear at the output of pulse amplifier 133 and are coupled to transistor 141 through capacitor 134. When a positive pulse is applied to transistor 141, the base emitter junction of the transistor is biased in the forward direction turning on the transistor. Point 155 is now connected to ground through the turned on transistor 141, and the potential at point 155 rapidly falls to a value near ground potential. Since the voltage across capacitor 151 cannot change instantaneously point 156 follows point 155 in the negative direction. Point 156 is negative with respect to point 155, so that when point 155 reaches a value near ground potential, point 156 will be negative by an amount equal to the voltage difference between them. Capacitor 151 begins to discharge through transistor 141 and resistors 153, 154, and 152, and if point 155 is held at ground potential long enough, point 156 will change to a positive voltage equal to the voltage at point 157 before the pulse was received by transistor 141. In this case point 156 will be positive with respect to point 155. In actual operation, however, the pulses generated in the noise blanking circuit are very short compared with the time constants of the charge and discharge paths of capacitor 151, therefore there will be time for point 156 to become only slightly less negative with respect to point 155 before the pulse ceases and transistor 141 is cut off. With transistor 141 cut off the voltages at points 155 and 156 rise to values very close to their value before the positive pulse turns on transistor 141. Capacitor 151 then charges to its original value through resistors 147, 152, 153, and 154.

The negative pulses thus generated are shaped by capacitors 148 and 149 and resistor 152 and applied through conductor 160 to the noise blanking module of the receiver 60 where they operate, as previously described, to disable the receiver.

The time constants of the charge and discharge paths of capacitor 151 are so large with respect to the duration of the pulses applied that the charge on capacitor 151 will not have time to charge appreciably during each pulse. However, the discharge path of capacitor 151 has a slightly shorter time constant than the charge path. As a result when a pulse is present at transistor 141, the voltage across capacitor 151 becomes less. During the interval between the pulses, the voltage across capacitor 151 increases. The decrease in voltage across capacitor 151 occurs at a faster rate than the increase.

Thus if a train of pulses of a sufficiently high repetition rate occur for a sufficiently long period of time the voltage across capacitor 151 will decrease to zero, reverse polarity and then increase. As the voltage across capacitor 151 changes, and point 155 is connected to ground through transistor 141, point 156 will no longer be negative but will be zero or positive depending upon the pulse repetition rate and its duration. Thus the negative going pulse which is applied to the blanking module 60, does not reach a negative potential with respect to ground, and diodes 63 and 64 are not biased in the forward direction. These diodes therefore do not furnish a low impedance path to ground from point 15 through capacitor 61. In addition diode 72 is not biased so as to bypass coil 33. The blanking pulses generated by the noise blanker 90 are therefore not permitted to disable the receiver by blanking the receiver at a rate such that the blanked out intervals overlap and no information is permitted to pass through the receiver. For pulse repetition rates lower than the level at which the blanking pulses are cut off, capacitor 151 still retains a charge which is inversely proportional to the pulse repetition rate. This reduction in charge of capacitor 151 as the pulse repetition rate increase causes a gradual reduction in the amplitude and blanking time of the blanking pulses applied to the receiver.

A portion of the output of IF amplifier 50, is coupled to the level shut off module 78 through coupling capacitor 79. Capacitor 79 is connected to choke 80 at point 82. The alternating voltage developed across choke 80 is rectified by diode 83 and filtered by capacitor 85 and appears across points 86 and 84 of the level shut off module as a D.C. voltage with point 86 being negative with respect to point 84. This potential difference is applied to transistor 106 through conductors 87 and 88, with the positive potential being applied to point 99 and the negative potential being applied to the emitter 108 of transistor 106.

As the signal strength of the receiver increases the signal at the output of the second intermediate frequency amplifier 50 increases causing the rectified output of level shut off module 78 to increase. This rectified voltage is applied across the base to emitter junction of transistor 106 in such a polarity as to gradually bias this transistor so that only the noise pulses above a certain threshold level can cause current to flow in transistor 106. As the signal strength of the output of the second IF amplifier 50 increase the threshold level is raised until a point is reached at which no noise pulses can cause transistor 106 to conduct and thus no blanking pulses are generated. Thus, as the carrier amplitude increases, only the larger impulse noise disturbances create blanking pulses until the carrier amplitude is such that there are no impulse disturbances which are sufficiently large to develop a blanking pulse and the blanker is biased off completely.

By thus blanking in the intermediate frequency stages of the receiver, adjacent carriers which are attenuated by the selectivity of the intermediate frequency amplifier stages are not present to cause splatter due to the modulation by the blanking pulses. A disadvantage of this form of blanking is that by waiting until the noise pulses have been stretched in the intermediate frequency portions of the receiver the blanking time required is increased.

Figure 4:
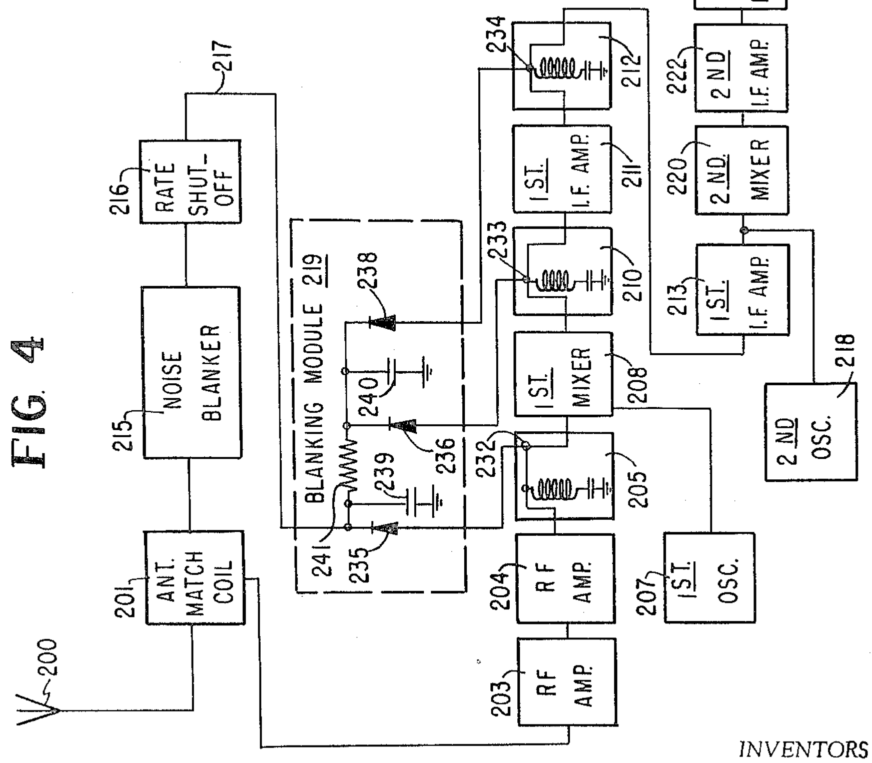
FIG. 4 is a partial schematic and partial block diagram of a radio receiver wherein signal conduction is interrupted in both the radio frequency and intermediate frequency portions.

FIG. 4, shows a block diagram and partial schematic of a circuit incorporating a form of blanking wherein blanking takes place in the RF portion of the receiver as well as in the IF section. Signals received on antenna 200 are coupled to the antenna matching coil 201 and from this coil to a noise blanker 215 and an RF amplifier 203. The noise blanker generates negative pulses in response to noise impulses present at the frequency to which it is tuned. These pulses are connected to blanking module 219 by means of rate shut off circuit 216 and conductor 217. Desired signals are amplified in RF amplifiers 203 and 204. The output of RF amplifier 204 appears across coil 205 and is mixed with the signal generated by first oscillator 207 and amplified in the first mixer 208. The output of the first mixer 208 appears across coil 210 and is coupled to the first IF amplifier 211 for further amplification. The output of IF amplifier 211 appears across coil 212 and is further amplified in first IF amplifier 213. The output of IF amplifier 213 is mixed with the output of second oscillator 218 in second mixer 220. The signal is further processed in the remainder of the receiver and appears as an audio output from speaker 230. Points 232, 233 and 234 in this signal path are connected to ground through diodes 235, 236, 238 and capacitors 239 and 240.

As previously described the output of the noise blanker 215 coupled to the blanking module 219 by means of the rate shut off circuit 216 and conductor 217 is normally a positive potential which biases the diodes 235, 236 and 238 so that they are non-conducting. When a blanking pulse appears at the output of the noise blanker it is coupled to the blanking module 219 through rate shut off module 216 and conductor 217 and diodes 235, 236, and 238 are biased so that they are conducting. This bypasses the signal appearing across coils 232, 233, and 234 to ground through the diodes 235, 236, 238 and the capacitors 239, and 240.

Figures 5A, 5B, 5C:
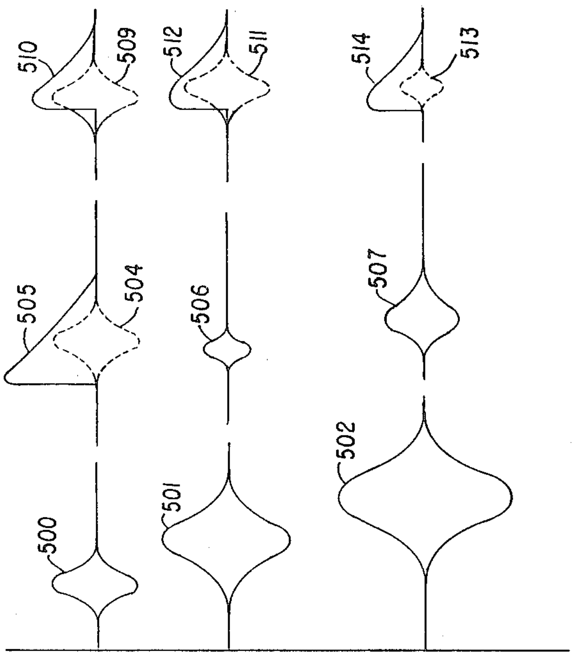
FIG. 5 illustrates the changes in a noise signal as it proceeds through a receiver, and the blanking action at the various points.

FIGURE 5 shows the shape of a noise signal as it proceeds through the receiver stages. In portion A of FIG. 5, pulse 500 is the noise signal which is present at point 232 in the RF amplifier. Pulses 501 and 502 are the noise signals which appear in the IF stages at points 233 and 234 respectively. It should be noted that as the noise signal proceeds through the receiver it is delayed and stretched.

Portion B of FIG. 5 shows the result of blanking in an RF stage. The noise signal 504 has been delayed so that the blanking pulse 505 will commence its blanking action at the proper time to interrupt noise signal 504. Blanking pulse 505 turns off the receiver RF stage during the interval of time that the noise signal 504 is present. Thus the noise signal is not permitted to proceed through the subsequent stages of the receiver. However, if a nearby signal is present blanking pulse 505 may generate splatter which is within the pass band of the IF amplifier. This splatter is shown as signals 506 and 507 which represent the signal at points 233 and 234 respectively. Thus in blanking the noise signal, splatter has been generated which will cause degradation of the received signal.

Portion C of FIG. 5 shows the result of blanking in both the RF and the IF stages, as shown in FIG. 4. By blanking in the RF stages, the strength of the noise present in the IF stages is reduced thus making blanking in those stages easier. Noise signal 509 represents the impulse noise present in the RF portion of the receiver. The blanking pulse 510 disables the RF portion of the receiver by bypassing coil 205 of FIG. 4. The blanking pulse 510 has been delayed due to the time taken to form the blanking pulse in the noise blanker and thus the leading edge of the noise pulse is not removed in the RF section of the receiver. It can be seen, however, that a large portion of the energy present in the noise pulse has been prevented from being further amplified in the intermediate frequency sections of the receiver. At the same time as the pulse is being applied to bypass coil 205 of FIG. 4, pulses are also applied to bypass coils 210 and 212. Thus any splatter created by the blanking in the RF section will not appear in the subsequent tuned circuits since they are bypassed during the time that this splatter is being generated. The portion of the signal shown as the solid lines of curve 511 represents the portion of the signal which was not blanked in the RF section of the receiver. When this signal reaches the IF section coil 210 of FIG. 4, it has been delayed and the blanking pulse 512 applied at this point will remove a portion of the energy which has been permitted to pass the RF blanking point. Splatter which is generated at this point in the blanking system is not permitted to energize the subsequent IF amplifier stage as coil 212 of that stage is bypassed during the time that the splatter is being generated. The remaining portion of the signal which was not blanked in the first two stages, indicated at 513 is completely blanked by the pulse 514 in the third stage. By blanking at these three points the width of the blanking pulses is reduced and splatter is effectively reduced. The blanking time required to blank in the RF and IF sections of the receiver simultaneously is only slightly longer than that required to blank in the RF section alone if the time necessary to re-energize the tuned circuits is neglected.

It is not necessary that the blanking of successive selective stages be accomplished partially in the radio frequency portion and partially in the intermediate frequency portion of the receiver. The blanking can take place completely in successive stages of the intermediate frequency portion of the receiver. By blanking at several successive stages the blanking time required is only slightly longer than that which would be required if all of the blanking took place in the first stage which is blanked. In addition the splatter protection provided is the same as if all of the blanking took place in the last stage blanked.

The invention provides, therefore, an improved impulse noise blanker which samples the noise energy in the radio frequency portion of the receiver and reduces the splatter which would be generated by applying blanking pulses to the radio frequency portion by applying the pulses to the intermediate frequency section of the receiver or to the radio frequency and intermediate frequency sections in combination.

We claim:

1. A carrier wave receiver including in combination, an intermediate frequency amplifier stage for translating a desired signal which may be accompanied by impulse noise disturbances and which stage is adapted to be interrupted by the application of blanking pulses thereto, radio frequency amplifier and converter means coupled to the input of said intermediate frequency amplifier stage, an antenna for receiving said carrier waves, a noise blanking system for the generation of blanking pulses in response to impulse noise applied thereto coupled to said antenna for receiving said carrier waves therefrom, first circuit means coupling said antenna to said radio frequency amplifier and converter means for applying said carrier waves thereto, and second circuit means connecting said noise blanking system to said intermediate frequency amplifier stage for applying said blanking pulses thereto to interrupt the same.

2. In a carrier wave receiver which includes an antenna for receiving the carrier waves, radio frequency amplifier and converter means coupled to the antenna for receiving the carrier waves therefrom and intermediate frequency amplifier means for translating a desired signal which may be accompanied by impulse noise disturbances, the combination including, first circuit means connecting the radio frequency amplifier and converter means to the intermediate frequency amplifier means, said first circuit means including a conducting path for the desired signal and a plurality of coils connecting said conducting path to an alternating current reference potential, a noise blanking system coupled to the antenna and adapted to receive the carrier waves therefrom and including means for the generation of blanking pulses in response to impulse noise applied thereto, second circuit means connected to said noise blanking system and including at least one diode connected between said alternating current reference potential and a point at which one of said coils is connected to said conducting path, said second circuit means including bias means to bias off said diode when no blanking pulse is present, said blanking pulses acting on said bias means to change the bias on said diode to cause the same to conduct.

3. In a carrier wave receiver which includes an antenna, radio frequency amplifier and converter means and intermediate frequency amplifier means for translating a desired signal which may be accompanied by impulse noise disturbances, the combination including, first circuit means connecting the radio frequency amplifier and converter means to the intermediate frequency amplifier means, said first circuit means including a conducting path for the desired signal and a plurality of coils connecting said conducting path to an alternating current reference potential, a noise blanking system coupled to the antenna for receiving a carrier wave and including means for the generation of blanking pulses in response to impulse noise applied thereto, second circuit means connected to said noise blanking system and including a plurality of diodes connected between said alternating current reference potential and points at which said coils are connected to said conducting path, said second circuit means including bias means to bias off said diodes when no blanking pulse is present, said blanking pulses acting on said bias means to change the bias on said diodes to cause them to conduct.

4. In a carrier wave receiver which includes an antenna, a radio frequency amplifier and converter means adapted to be interrupted by the application of blanking pulses thereto and an intermediate frequency amplifier stage coupled to said radio frequency amplifier and converter means for translating a desired signal which may be accompanied by impulse noise disturbances and which intermediate frequency amplifier stage is adapted to be interrupted by the application of blanking pulses thereto, a noise blanking system including in combination, means for the generation of blanking pulses in response to impulse noise applied thereto, first circuit means connecting the radio frequency amplifier and converter means and said blanking pulse generating means to the antenna, second circuit means connecting said blanking pulse generating means to the intermediate frequency amplifier stage and to the radio frequency amplifier and converter means for applying said blanking pulses thereto to interrupt the intermediate frequency amplifier stage and the radio frequency amplifier and converter means.

5. In a carrier wave receiver which includes radio frequency amplifier means, converter means and intermediate frequency amplifier means for translating a desired signal which may be accompanied by impulse noise disturbances, the combination including, first circuit means connecting the radio frequency amplifier means and the converter means, second circuit means connecting the converter means and the intermediate frequency amplifier means, said first and second circuit means including first and second conducting paths respectively for the desired signal, a plurality of coils with each of said coils connecting one of said conducting paths to an alternating current reference potential, each of said conducting paths having at least one of said coils connected thereto, a noise blanking system adapted to receive a carrier wave and including means for the generation of blanking pulses in response to impulse noise applied thereto, third circuit means connected to said noise blanking system and including at least one diode connected between said alterating current reference potential and a point at which one of said coils is connected to said first conducting path, said third circuit means further including at least one diode connected between said alternating current reference potential and a point at which one of said coils is connected to said second conducting path, said third circuit means including bias means to bias off said diodes when no blanking pulse is present, said blanking pulses acting on said bias means to change the bias on said diodes to cause them to conduct to attenuate the signals applied through said conducting paths.

6. In a carrier wave receiver which includes an antenna, a radio frequency amplifier stage, a mixer stage, and first and second intermediate frequency amplifier stages for translating a desired signal which may be accompanied by impulse noise disturbances, the combination including, first circuit means connecting the radio frequency amplifier stage and the mixer stage, second circuit means connecting the mixer stage and the first intermediate frequency amplifier stage, and third circuit means connecting the first intermediate frequency amplifier stage and the second intermediate frequency amplifier stage, said first, second, and third circuit means including conducting paths for the desired signal, and a plurality of coils connecting each of said conducting paths to an alternating current reference potential, a noise blanking system connected to the antenna for receiving a carrier wave and including means for the generation of blanking pulses in response to impulse noise applied thereto, fourth circuit means connected to said noise blanking system and including a plurality of diodes connected between said alternating current reference potential and points at which each of said coils are connected to each of said conducting paths, each of said plurality of coils having at least one of said diodes coupled thereto, said fourth circuit means including bias means to bias off said diodes when no blanking pulse is present, said blanking pulses acting on said bias means to change the bias of said diodes to cause them to conduct.

7. A carrier wave receiver including in combination, an intermediate frequency amplifier stage for translating a desired signal which may be accompanied by impulse noise disturbances and which stage is adapted to be interrupted by the application of blanking pulses thereto, a radio frequency amplifier and converter means coupled to the input of said intermediate frequency amplifier stage, a noise blanking system, adapted to receive a carrier wave and including means for generating blanking pulses in response to impulse noise greater than a predetermined threshold level applied thereto, signal level detection means connected to said intermediate frequency amplifier stage to provide a potential proportional to the signal level in said intermediate frequency amplifier stage, first circuit means connecting said signal level detection means to said pulse generating means for applying said potential thereto to increase said threshold level in proportion to the increase in said potential, second circuit means connecting said blanking pulse generating means to the intermediate frequency amplifier stage for applying said blanking pulses thereto to interrupt said intermediate frequency amplifier stage.

8. A carrier wave receiver including in combination, an antenna, radio frequency amplifier and converter means coupled to said antenna for receiving said carrier waves therefrom, an intermediate frequency amplifier stage coupled to said radio frequency amplifier and converter means for translating a desired signal which may be accompanied by impulse noise disturbances and which stage is adapted to be interrupted by the application of blanking pulses thereto, a noise blanking system coupled to said antenna for receiving said carrier waves therefrom and including means for generating blanking pulses in response to impulse noise greater than a predetermined threshold level applied thereto, circuit means connecting said blanking pulse generating means to said intermediate frequency amplifier stage for applying said blanking pulses thereto to interrupt said intermediate frequency amplifier stage, said circuit means including rate shut off means for reducing the amplitude of said blanking pulses when said blanking pulses exceed a predetermined pulse repetition rate for a predetermined time.

9. In a carrier wave receiver which includes radio frequency amplifier and converter means adapted to be interrupted by the application of blanking pulses thereto and an intermediate frequency amplifier stage coupled to the radio frequency amplifier and converter means for translating a desired signal which may be accompanied by impulse noise disturbances and which intermediate frequency amplifier stage is adapted to be interrupted by the application of blanking pulses thereto, a noise blanking system adapted to receive a carrier wave and including in combination; signal level detection means connected to the intermediate frequency amplifier stage to provide a potential proportional to the signal level in said intermediate frequency amplifier stage, means for generating blanking pulses in response to impulse noise greater than a predetermined threshold level applied thereto, first circuit means connecting said signal level detection means to said pulse generating means for applying said potential to said pulse generating means to increase said threshold level in proportion to the increase in said potential, second circuit means connecting said blanking pulse generating means to the intermediate frequency amplifier stage and to the radio frequency amplifier and converter means for applying said blanking pulses thereto to interrupt the intermediate frequency amplifier stage and the radio frequency amplifier and converter means.

10. In a carrier wave receiver which includes an antenna, radio frequency amplifier and converter means adapted to be interrupted by the application of blanking pulses thereto connected to the antenna, and an intermediate frequency amplifier stage coupled to said radio frequency amplifier and converter means for translating a desired signal which may be accompanied by impulse noise disturbances and which intermediate frequency amplifier stage is adapted to be interrupted by the application of blanking pulses thereto, a noise blanking system coupled to the antenna for receiving a carrier wave including in combination; means for generating blanking pulses having a first amplitude in response to impulse noise greater than a predetermined threshold level applied thereto, circuit means connecting said blanking pulse generating means to the intermediate frequency amplifier stage and to the radio frequency amplifier and converter means for applying said blanking pulses thereto to interrupt the intermediate frequency amplifier stage and the radio frequency amplifier and converter means, said circuit means including rate shut off means for reducing the amplitude of said blanking pulses from said first amplitude to a second amplitude when said blanking pulses exceed a predetermined pulse repetition rate for a predetermined time.

11. In a carrier wave receiver which includes a radio frequency portion for translating a desired signal which may be accompanied by impulse noise disturbances and an intermediate frequency portion following said radio frequency portion for translating the carrier wave, said intermediate frequency portion including a conducting path for the desired signal having a plurality of selective stages adapted to be interrupted by the application of blanking pulses thereto, a noise blanking system coupled to the radio frequency portion for receiving a carrier wave and including means for the generation of blanking pulses in response to impulse noise applied thereto, and circuit means connecting said noise blanking system to said plurality of selective stages for applying said blanking pulses thereto to interrupt said plurality of selective stages.

References Cited by the Examiner

UNITED STATES PATENTS

| | | | |
|---|---|---|---|
| 3,140,446 | 7/1964 | Myers et al. | 325—324 X |
| 3,191,123 | 6/1965 | Eness et al. | 325—473 X |

KATHLEEN H. CLAFFY, *Primary Examiner.*

R. LINN, *Assistant Examiner.*